UNITED STATES PATENT OFFICE.

ARNOLD VOSWINKEL, OF BERLIN, GERMANY.

DOUBLE SALT OF FERRIC CHLORID AND COTARNIN HYDROCHLORATE AND PROCESS OF MAKING SAME.

No. 802,835.      Specification of Letters Patent.      Patented Oct. 24, 1905.

Application filed November 28, 1904. Serial No. 234,679. (Specimens.)

*To all whom it may concern:*

Be it known that I, ARNOLD VOSWINKEL, apothecary and doctor of philosophy, a subject of the German Emperor, residing at 154 Kurfürstenstrasse, in the city of Berlin, Kingdom of Prussia, German Empire, have invented a certain new and useful Double Salt of Ferric Chlorid and Cotarnin Hydrochlorate and Process of Making the Same, of which the following is a specification.

In scientific literature double salts from metal salts and cotarnin hydrochlorate are already described, such as mercuri-chlorid-cotarnin-hydrochlorate, platinum-chlorid-cotarnin-hydrochlorate, and the double salt with chlorid of gold. (See Gmelin-Kraut, *Handbuch der Organischen Chemie*, fourth edition, Vol. 4, second part, 1866, page 1068.) In the same passage Blyth has pointed out that ferric-oxid salts are not colored by cotarnin. Now I have found that chlorid of iron is particularly distinguished by its property of forming a very well crystallized double salt with cotarnin hydrochlorate, which double salt is to be regarded as a combination of one molecule chlorid of iron and two molecules of cotarnin hydrochlorate and the formula of which may be thus described: $Fe_2Cl_6,(C_{12}H_{14}NO_3Cl)_2$. In order to manufacture this product two hundred and eighty-five grams of cotarnin are dissolved in 2.5 kilograms of absolute alcohol by the assistance of three hundred and sixty grams hydrochloric acid of twenty-five-per-cent. strength. Then this solution is diluted with six hundred and seventy-five grams of a solution of chlorid of iron of 1.280 specific gravity and 2.5 kilograms absolute alcohol. Both solutions are mixed. After a short time the product of the reaction will separate out as delicate orange-colored leaves, which when they are left for some time in the liquid will coalesce, so as to form compact ruby-colored crystallic masses. The double salt is separated from the mother-liquor, washed with alcohol-ether, and is then dried. The compound melts at 104° to 105° centigrade, its proportion of iron being, computed at Fe, 13.40 per cent. and being found by actual analysis to be 13.466 per cent. in one instance and 13.478 per cent. in another instance. It dissolves readily in water and in dilute alcohol and more difficultly in absolute alcohol. In ether it is almost insoluble. If the aqueous solution is heated for from one to two hours up to the boiling temperature, the compound is decomposed and a rust-brown precipitate is formed which obviously consists of a chlorin-substituted cotarnin, while the chlorid of iron is converted into oxy chlorid of iron.

Instead of alcohol some other suitable solvent may be used. The thus-crystallized chlorid of iron may, for instance, be mixed with cotarnin chlorid and may then be reduced to dryness *in vacuo* and at the exclusion of high temperatures. The water of crystallization replaces the solvent in this instance.

The compound is intended for medicinal and therapeutic uses on account of its extraordinary styptic or blood-stopping action, both components assisting each other considerably in producing this action. The stopping of the flow of blood is effected by the cotarnin in consequence of its action upon the nerves of the ducts, while as regards the chlorid of iron the action is brought about by the coagulation of the blood. Hence the action of the cotarnin is but temporary, and in view of the additional fact that the exclusive use of chlorid of iron entails disadvantages, such as an irritating action and a strong yellow coloration, the double salt described in consequence of its faintly-acid nature shows the combined action of both components without their disadvantages.

What I claim, and desire to secure by Letters Patent of the United States, is—

1. The process of manufacturing a double salt from chlorid of iron and cotarnin hydrochlorate which consists in reacting on two molecules of cotarnin hydrochlorate with one molecule of ferric chlorid.

2. The process for manufacturing a double salt from chlorid of iron and cotarnin hydrochlorate which consists in reacting upon a solution of one molecule of chlorid of iron with a solution of two molecules of cotarnin hydrochlorate and separating the product of the reaction from the remaining liquid and purifying and drying the said product.

3. As a new product a crystalline double salt of chlorid of iron and cotarnin hydrochlorate, soluble in water and dilute alcohol and melting at about 104° to 105° centigrade.

In testimony whereof I have signed my name to this specification in the presence of two subscribing witnesses.

ARNOLD VOSWINKEL.

Witnesses:
  WOLDEMAR HAUPT,
  HENRY HASPER.